(12) United States Patent
Brosilow

(10) Patent No.: US 6,349,803 B2
(45) Date of Patent: Feb. 26, 2002

(54) SHIM STRUCTURE FOR SOUND DAMPENING BRAKE SQUEAL NOISE

(75) Inventor: Jerry L. Brosilow, Richmond, VA (US)

(73) Assignee: Qualitee International Ltd. Partnership, Richmond, VA (US)

( * ) Notice: Subject to any disclaimer, the term of this patent is extended or adjusted under 35 U.S.C. 154(b) by 0 days.

(21) Appl. No.: 09/782,878

(22) Filed: Feb. 14, 2001

Related U.S. Application Data

(62) Division of application No. 09/288,246, filed on Apr. 8, 1999, now Pat. No. 6,256,858.

(51) Int. Cl.[7] .................. F16D 65/38; F16D 65/092
(52) U.S. Cl. ............... 188/73.37; 188/205 A; 188/250 G; 188/250 E
(58) Field of Search .......... 188/73.37, 205 A, 188/73.1, 264 G, 250 E, 250 B, 250 R, 250 G, 251 A, 251 M, 251 R; 192/30 V, 107 R, 107 M

(56) References Cited

U.S. PATENT DOCUMENTS

| 3,918,555 | A | * | 11/1975 | Rath | 188/73.37 |
|---|---|---|---|---|---|
| 4,373,615 | A | * | 2/1983 | Melinat | 188/73.37 |
| 4,660,685 | A | * | 4/1987 | Thacker et al. | 188/73.37 |
| 5,099,962 | A | * | 3/1992 | Furusu et al. | 188/73.37 |
| 5,407,034 | A | * | 4/1995 | Vydra et al. | 188/73.37 |
| 5,480,008 | A | * | 1/1996 | Hummel et al. | 188/73.37 |
| 5,518,088 | A | * | 5/1996 | Brosilow | 188/73.37 |
| 5,762,166 | A | * | 6/1998 | Yano et al. | 188/73.37 |
| 5,791,443 | A | * | 8/1998 | Manz | 188/264 G |
| 5,816,370 | A | * | 10/1998 | Verbeeten et al. | 188/73.37 |
| 5,823,301 | A | * | 10/1998 | Bildner et al. | 188/73.37 |
| 5,842,546 | A | * | 12/1998 | Biswas | 188/73.37 |
| 5,842,686 | A | * | 12/1998 | Hansen et al. | 188/73.37 |
| 5,975,252 | A | * | 11/1999 | Suzuki et al. | 188/73.1 |
| 6,105,736 | A | * | 8/2000 | Akita et al. | 188/73.37 |
| 6,170,620 | B1 | * | 1/2001 | Akita et al. | 188/73.37 |
| 6,256,858 | B1 | * | 7/2001 | Brosilow | 29/525.05 |
| 2001/0004034 | A1 | * | 6/2001 | Brosilow | 188/73.37 |

FOREIGN PATENT DOCUMENTS

| EP | 163182 | * | 12/1985 |
|---|---|---|---|
| WO | 9615386 | * | 5/1996 |

* cited by examiner

Primary Examiner—Douglas C. Butler
(74) Attorney, Agent, or Firm—Donald C. Felix

(57) ABSTRACT

A silencer structure is mounted on a friction pad of a disc brake assembly by retaining pins which extend through the shim structure and into the backing plate for preventing dislodging of the shim structure in service. The force of the rotating action of the brake disc is at a 90° angle to the retaining pin. This 90° angle provides effective resistance to any shifting or rotation of the shim structure with respect to the backing plate during actuation of a disc brake apparatus. The retaining pin has an outer surface which is disposed substantially flush with the outer surface of the shim structure. The outer surface of the retaining pin therefore does not interfere with the positioning or functioning of an actuator piston structure, caliper structure or other disc brake structure. The flush mounting allows the system of the present invention to be used for any caliper design.

12 Claims, 3 Drawing Sheets

SHIM STRUCTURE FOR SOUND DAMPENING BRAKE SQUEAL NOISE

This application is a division of Ser. No. 09/288,846 filed Apr. 8,1999, now U.S. Pat. No. 6,256,858.

BACKGROUND OF THE INVENTION

This invention relates to a shim structure for sound dampening brake squeal noise in a disc brake apparatus.

This invention relates particularly to a shim structure which includes a sheet of shim material and a continuous layer of an adhesive on one, inner surface only of the sheet of shim material. The adhesive adheres the shim structure to a steel backing plate. The backing plate has a friction pad structure mounted on the other side of the steel backing plate.

My U.S. Pat. No. 5,518,088 issued May 21, 1996 discloses several embodiments of a shim structure having a sheet of aluminum and a continuous membrane of a high temperature acrylic adhesive which is on one surface only of the sheet of aluminum and which adheres the shim structure to a steel backing plate. This U.S. Pat. No. 5,518,088 is incorporated by reference in this application.

Aluminum is the preferred silencer material, but the present invention will also work for shim structures which use aluminum, metal alloys, laminates of metals and other materials, or plastic silencers. The shim structure is constructed of silencer materials which have vibratory characteristics sufficiently different from the vibratory characteristics of the steel backing plate so as to effectively dampen the noise or squeal which could otherwise be produced during braking operation.

In disc brake apparatus a rotatable disc rotates with the axle of a wheel to be braked. Two friction pad structures are disposed on opposite sides of the disc. Each friction pad structure comprises a steel backing and a brake pad. The friction pad structures are moved inwardly, toward one another, under the force supplied by a hydraulically actuated piston and related caliper fingers of a caliper mounting structure. The plates are moved outwardly, away from one another, by return springs.

When the piston and caliper fingers press the backing plates inwardly, the inner surfaces of the braking pads are engaged in frictional, braking contact with the disc.

A relatively high pitched and undesired brake squeal noise can be produced during such braking engagement of the pads on the disc.

The brake squeal noise is produced by vibration of the friction pad structures during braking actuation.

To reduce and/or to eliminate the undesired brake squeal noise, sound dampening shim constructions have been used, both by original equipment manufacturers and by brake repair shops.

The sound dampening shim constructions have been positioned both between the hydraulically actuated piston and the piston engaging surface of the related steel backing plate and also between the caliper fingers and the caliper contact surface of the related steel backing plate.

As the thickness of the metal component of the shim structure is increased, and as metals heavier than aluminum are used in the silencer, there is a risk that the silencer may dislodge in service. The force of the rotating of the brake disc, as transmitted into the friction pad structure, can cause a torque or twisting force to be imposed on the shim structure by the related piston and caliper elements of the disc brake apparatus so as to produce a shear force in the adhesive of the shim structure. Under the extreme conditions of heat and vibration incurred in the disc brake apparatus, the adhesive may tend to crystallize; or the adhesive may not, by itself, be sufficient to prevent dislodging of the shim structure from the backing plate in service.

It is a primary object of the present invention to construct a friction pad and shim structure in which at least one retaining pin extends through the shim structure and into the backing plate for preventing dislodging of the shim structure in service.

It is a related object to insert the retaining pin through the shim structure and into the backing plate so that the force of the rotating action of the brake disc is at a 90° angle to the retaining pin. This 90° angle provides effective resistance to any shifting or rotation of the shim structure with respect to the backing plate during actuation of a disc brake apparatus.

It is another important object of the present invention to construct a retaining pin so that the retaining pin has an outer surface which is disposed substantially flush with the outer surface of the shim structure, whereby the outer surface of the retaining pin does not interfere with the positioning or functioning of an actuator piston structure, caliper structure or other disc brake structure. The flush mounting allows the system of the present invention to be used for any caliper design.

It is another object of the present invention to construct the silencer shim structure so that the shim structure can be added to the friction pad structure at the last stage of production, after painting of the friction pad structure. This enables the silencer to be graphically decorated because it is installed after the pad painting process. This has two benefits:

1) the silencer can be inexpensively decorated; and
2) the mounting process does not interfere with the pad production cycle.

It is another object of the present invention to construct a shim structure which avoids problems presented by prior shim constructions and which also has functional and marketing benefits not obtainable with prior shim constructions.

SUMMARY OF THE PRESENT INVENTION

The present invention involves a method of and an apparatus for mounting a silencer shim structure on a backing plate of a disc brake assembly.

In the method of the present invention at least one pin receiving hole is formed in a first surface of a backing plate of a disc brake assembly in at least one selected backing plate location.

At least one pin receiving opening is formed in a silencer shim structure in at least one selected shim structure location.

The inner surface of the silencer structure is placed on a first surface of the backing plate. The selected shim structure location is aligned with the selected backing plate location.

A retaining pin is inserted through the opening in the shim structure and into a friction tight, irreversible fit in the related, aligned hole in the backing plate so as to leave a top surface of the pin substantially flush with the outer surface of the shim structure.

The shim structure retaining pin functions to resist shifting or rotation of shim structure with respect to the backing plate.

The substantially flush positioning of the top surface of the retaining pin with the outer surface of the shim structure does not interfere with the positioning or functioning of an actuator piston structure or a caliper structure or other disc brake structure relative to the surface of the backing plate which is covered by the silencer shim structure.

In preferred embodiments of the present invention two shim structure retaining pins are inserted through related, aligned openings in the shim structure and the backing plate.

In preferred embodiments of the invention the retaining pin has a shank portion and has a head portion having a larger diameter than the shank portion.

The retaining pin is a harder material than the shim structure material. Insertion of the retaining pin through the shim structure and into the backing plate causes the head portion of the retainer pin to countersink itself within the softer shim structure when the top surface of the pin is pushed down substantially flush with the outer surface of the shim structure.

The counter-sinking increases the resistance to shear forces tending to separate the shim structure from the backing plate by the vibrations incurred during braking operation of the disc brake assembly.

The shim structure includes an outer layer of shim material. Aluminum is the preferred material for the outer layer, but other materials, such as, for example, metal alloys, layers or laminates of metals and adhesives or other materials, and plastic materials may be used.

The shim structure includes an adhesive layer on the inner side only so as to be positioned between the outer shim material and the backing plate.

In one embodiment of the invention, the adhesive is high temperature acrylic. In another embodiments, the adhesive is a two stage adhesive comprising a thicker layer of a thermal setting adhesive and a thinner layer of an acrylic pressure sensitive adhesive or only a layer of thermal setting adhesive.

The shank of the retaining pin has outwardly projecting vanes which are formed to a thread-type configuration prior to insertion of the pin into the opening in the backing plate. The insertion of the pin into the backing plate deforms the vanes sufficiently so as to prevent the pin from screwing itself back out of the backing plate during the vibratory conditions occurring during braking operation of the disc brake assembly.

The recessed pin or pins that secure the silencer in place are imbedded through the brake pad backing plate and also function as a sound dampening system because they are a different density than the brake pad backing plate and thus interrupt and lower the sound wave frequency the same as a plug in a bell.

Methods and apparatus which incorporate the features described above and which are effective to function as described above comprise further, specific objects of the present invention.

Other and her objects of the present invention will be apparent form the following description and claims and are illustrated in the accompanying drawings, which by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

BRIEF DESCRIPTION OF THE DRAWING VIEWS

FIG. 1 shows how a shim structure constructed in accordance with one embodiment of the present invention is incorporated in the disc brake apparatus for dampening brake squeal noise.

DETAILED DESCRIPTION OF THE PREFERRED EMBODIMENTS

Figure 1:
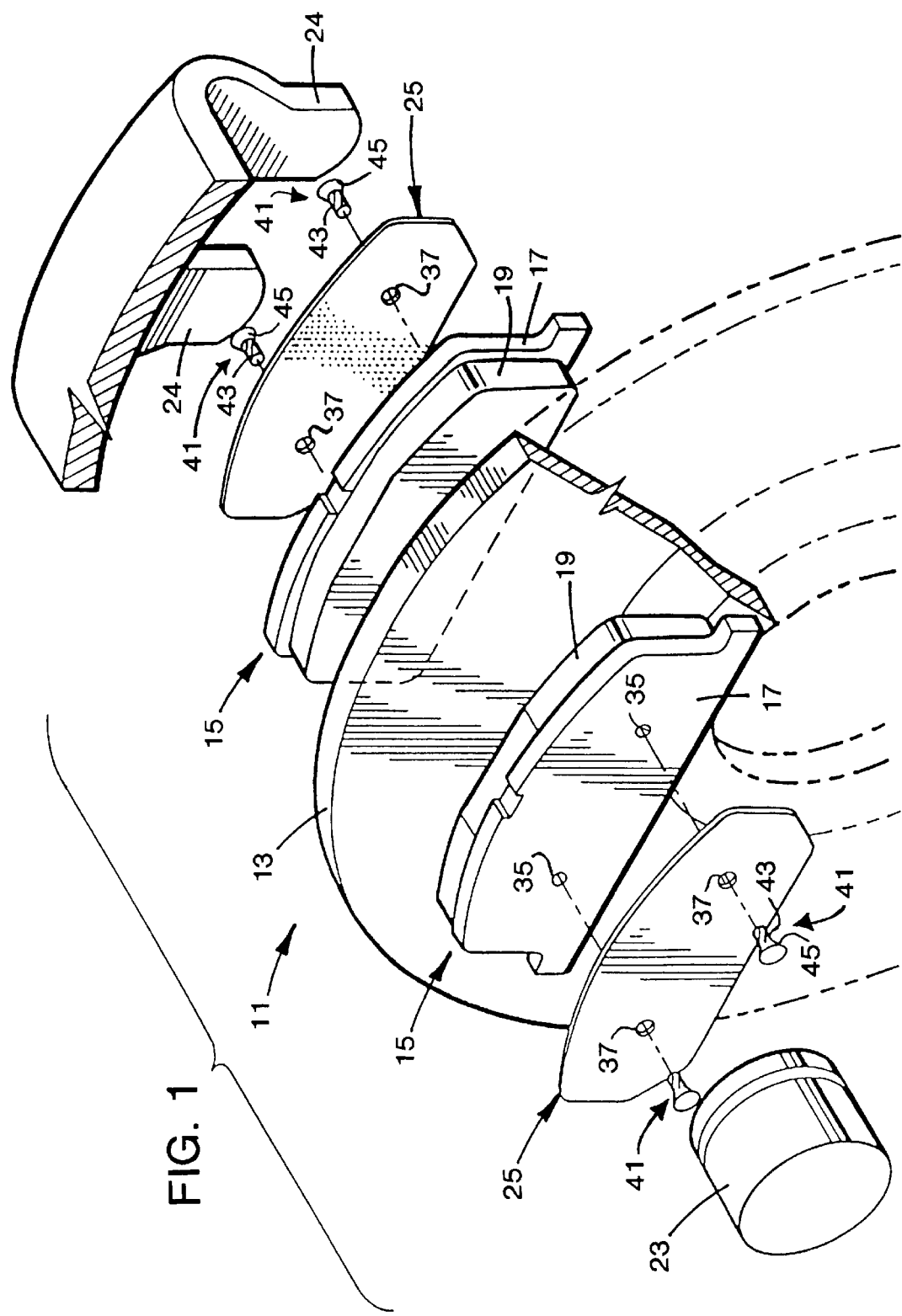
FIG. 1 is an exploded, isometric view of a disc brake apparatus.

FIG. 1 is an exploded, isometric view of a disc brake apparatus indicated generally by the reference numeral 11 in FIG. 1.

The disc brake apparatus 11 comprises a rotatable disc 13 which rotates with the axle of a wheel to be braked.

The disc brake apparatus also includes two friction pad structures 15. Each friction pad structure comprises a steel backing plate 17 and a brake pad 19 which is mounted on the disc side of the steel backing plate.

The two backing plates 17 are suspended in a conventional caliper mounting structure (not shown in FIG. 1) by rods which extend through openings in the upper corners of the backing plates 17. This caliper mounting permits the backing plates to move axially on the support rods.

The plates are moved inwardly toward one another under the force applied by a hydraulically actuated piston 23 and the related caliper fingers 24.

When the piston 23 and fingers 24 press the backing plates inwardly, the inner surfaces of the braking pads 19 are engaged in frictional, braking contact with the disc 13.

A relatively high pitched and undesired brake squeal noise can be produced during such braking contact.

A brake squeal noise often occurs after the brake pads 19 are replaced.

Brake squeal noise can, however, occur at other times for a variety of reasons.

The brake squeal noise is, as noted above, of a relatively high frequency, and it is produced by vibration of a friction pad structure 15 during braking actuation.

The vibration can be produced during the burnishing in process of the friction pads 19 on the disc 13. There is a certain amount of porosity in the surfaces of both the disc and the brake pads 19. The porosity of the surfaces can produce vibrations in the friction pad structures 15 until the inter-engaged surfaces have been rubbed together sufficiently long to eliminate or to substantially reduce the porosity and to become burnished surfaces.

The back surface of the steel backing plate 17 can also have a certain amount of unevenness in finish which can present high spots of engagement with the piston 23 and/or caliper fingers 24; and this can also lead to some undesired vibrations of the friction pad structures 15.

In efforts to reduce and/or eliminate the undesired brake squeal noise sound dampening shim constructions 25 have been use, both by original equipment manufacturers and by brake repair shops.

The sound dampening shim constructions 25 have been positioned between the hydraulically actuated piston 23 and the piston facing surface of the friction pad structure 15 and between the caliper fingers 24 and the calipers contact surface of the associated friction pad structures 15.

The sound dampening shim constructions used in the prior art have incorporated one or more layers of metal shim materials and adhesives for attaching the shim materials to the steel backing plate.

As the thickness of the metal component 30 of the shim structure 25 is increased, and as metals heavier than aluminum are used in the silencer, there is a risk that the silencer may dislodge in service. The force of the rotating of the brake disc 13, as transmitted into the friction pad structure 15, can cause a torque or twisting force to be imposed on the shim structure 25 by the related piston 23 and caliper elements 24 of the disc brake apparatus 11 so as to product a shear force in the adhesive 33 of the shim structure 25. Under the extreme conditions of heat and vibration incurred in the disc brake apparatus 11, the adhesive 33 may tend to crystallize; or the adhesive 33 may not, by itself, be sufficient to prevent dislodging of the shim structure 25 from the backing plate 17 in service.

It is a primary object of the present invention to construct a friction pad and shim structure combination in which at least one retaining pin 41 extends through the shim structure 25 and into the backing plate 17 for preventing dislodging of the shim structure 25 in service.

It is a related object to insert the retaining pin 41 through the shim structure 25 and into the backing plate 17 so that the force of the rotating action of the brake disc 13 is at a 90° angle to the retaining pin 41. This 90° angle provides effective resistance to any shifting or rotation of the shim structure 25 with respect to the backing plate 17 during actuation of the disc brake apparatus 11.

It is another important object of the present invention to construct a retaining pin 41 so that the retaining pin 41 has an outer surface which is disposed substantially flush with the outer surface 31 of the shim structure 25, whereby the outer surface of the retaining pin 41 does not interfere with the positioning or functioning of an actuator piston 23 structure, caliper structure 24 or other disc brake structure. The flush mounting allows the system of the present invention to be used for any caliper design.

In accordance with the preferred embodiments of the present invention (and as illustrated in FIGS. 1–4 of the drawings) pin receiving holes 35 are formed in a first surface of a backing plate 17 at selected locations in the backing plate.

Corresponding pin receiving openings 37 are formed in the silencer shim structure 25 so that the openings 37 can be aligned with the openings 35.

The inner, adhesive covered surface of the silencer structure is placed on the first surface of the backing plate 17 with each opening 37 aligned with a corresponding opening 35. A retaining pin 41 is inserted through the opening 37 in the shim structure 25 and is pressed into a friction tight, irreversible fit in the related, aligned hole 35 in the backing plate 17 so as to leave the top surface of the pin 41 substantially flush with the outer surface 31 of the shim structure 25. See FIG. 3.

Each shim structure retaining pin 41 functions to resist shifting or rotation of the shim structure 25 with respect to the backing plate 17.

The substantially flush positioning of the top surface of the retaining pin 41 with the outer surface 31 of the shim structure 25 does not interfere with the positioning or functioning of an actuator piston 23 structure of a caliper structure 24 or other disc brake structure relative to the surface of the backing plate 17 which is covered by the silencer shim structure 25.

In preferred embodiments of the invention each retaining pin 41 has a shank portion 43 and has a head portion 45. The head portion 45 has a larger diameter than the shank portion 43.

Figure 3:
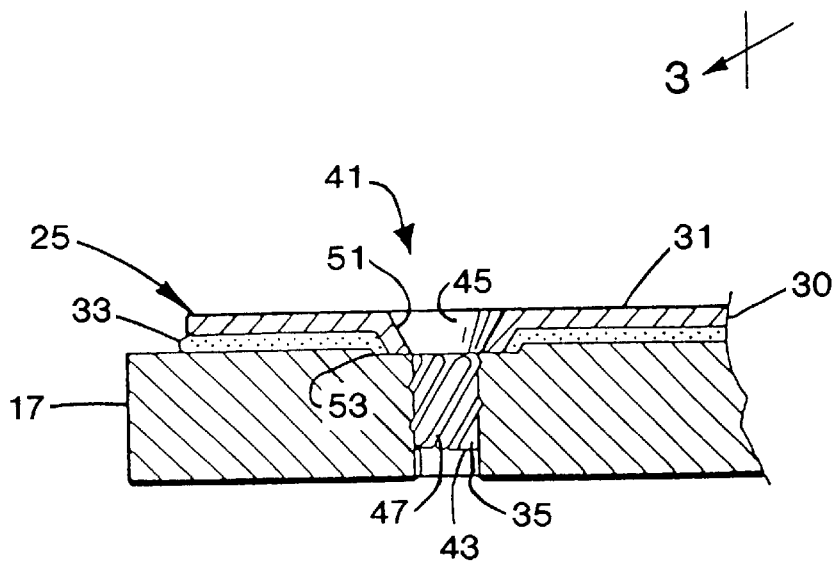
FIG. 3 is a cross sectional view taken along the line and in the direction indicated by the arrows 3—3 in FIG. 2.
Figure 4:
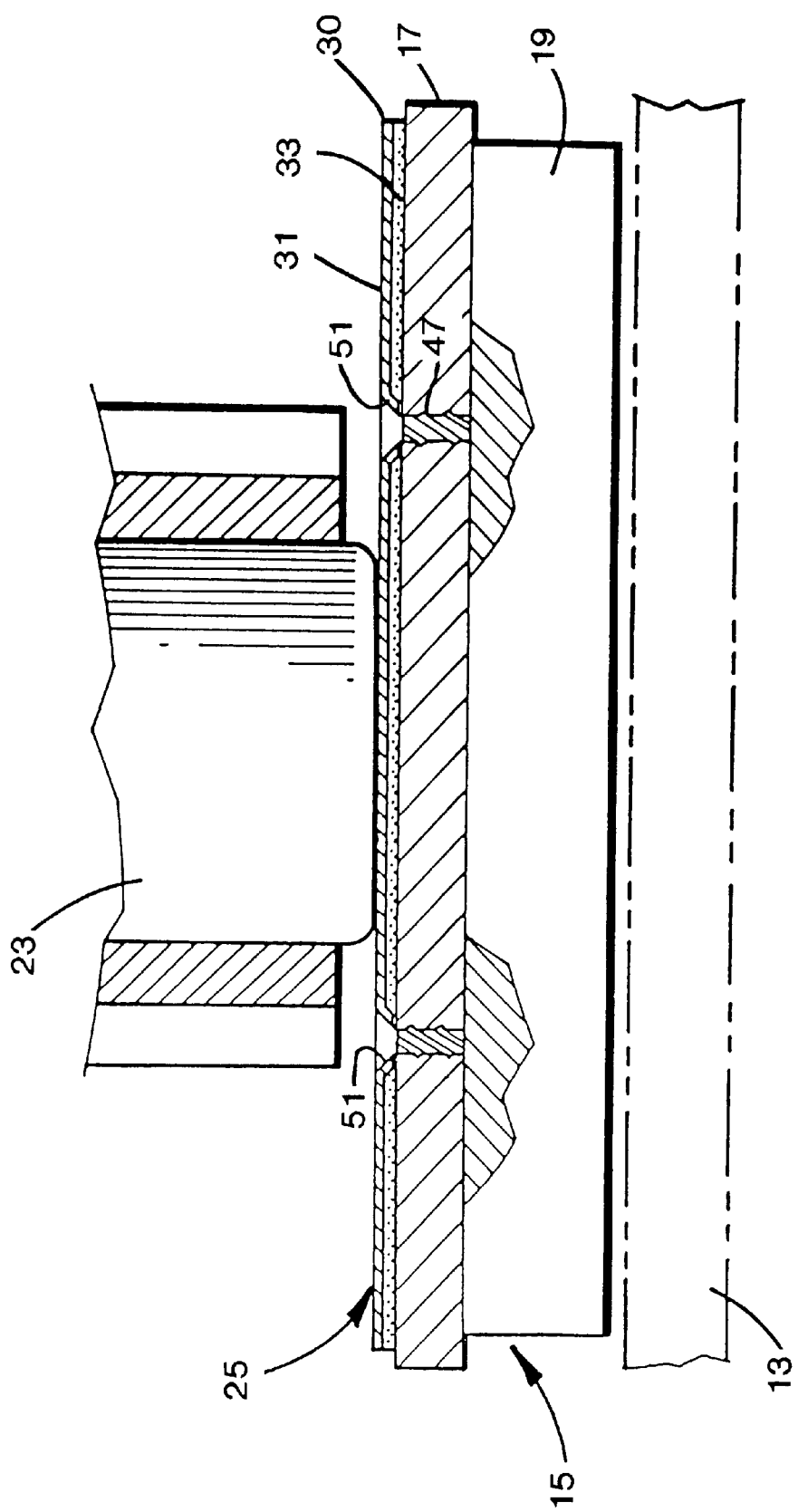
FIG. 4 is an enlarged, side elevation view, partly in cross section, showing details of the shim structure as installed on the backing plate of a friction pad structure of a brake apparatus shown in FIG. 1.

The retaining pin 41 is a harder material than the shim structure 25 material. Insertion of the retaining pin 41 through the shim structure 25 and into the backing plate 17 causes the head portion 45 of the retaining pin 41 to counter sink itself within the softer shim structure 25 when the top surface of the pin is pushed down substantially flush with the outer surface 31 of the shim structure. This is best illustrated in FIG. 3.

The counter sinking increases the resistance to shear forces tending to separate the shim structure 25 from the backing plate 17 by the vibrations incurred during braking operation of a disc brake assembly 11.

The shim structure 25 includes an outer layer 30 of shim material. Aluminum is a preferred material for the outer later; but other materials, such as, for example, metal alloys, laminates or layers of metals and adhesive and other materials, and plastic materials may be used.

The shim structure 25 includes an adhesive layer 33 on the inner side only so that the adhesive is positioned between the outer shim material 30 and the backing plate 17.

In one embodiment of the invention the adhesive is high temperature acrylic.

In other preferred embodiments of the present invention, the adhesive is a two stage adhesive comprising a thicker layer of a thermal setting adhesive and a thinner layer of an acrylic pressure sensitive adhesive or only a layer of thermal setting adhesive.

Figure 2:
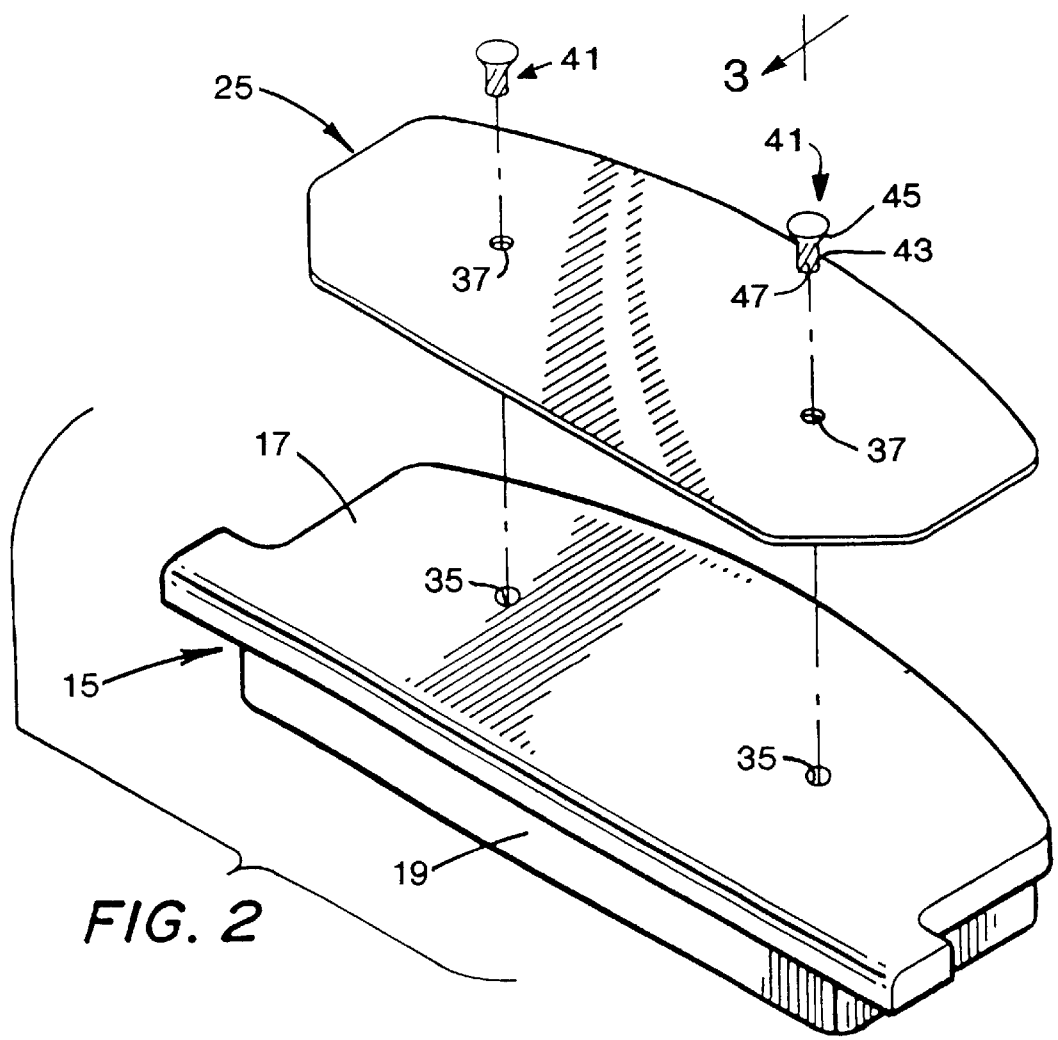
FIG. 2 is an exploded, isometric view showing details of one embodiment of a him structure and backing plate constructed in accordance with the present invention.

As illustrated in FIGS. 1 and 2 of the drawings, the shank 43 of the retaining pin 41 has outwardly projecting vanes 47 which are formed to a thread type configuration prior to insertion of the pin 41 into the opening 35 in the backing plate. The insertion of the pin 41 into the steel backing plate 17 deforms the vanes 47 sufficiently so as to prevent the pin 41 from screwing itself back out of the backing plate 17 during the vibratory conditions occurring during braking operation of the disc brake assembly 11.

Depending upon the composition of the shim material 30, the configuration of the side wall portions of the shim material 30 surrounding the enlarged head portion 45 of the pin may vary somewhat from that shown in FIG. 3. For example, the lowermost part of the countersunk opening 51 may have a thinner side wall than that illustrated, and the thickness of the countersunk portion of the side wall may vary with the depth of the countersunk opening 51.

Also, parts of the backing plate 17 on the surface facing the shim structure 25 may be formed with a slightly countersunk configurations 53 as illustrated in FIG. 3.

While I have illustrated and described the preferred embodiments of my invention, it is to be understood that these are capable of variation and modification, and I therefore do not wish to be limited to the precise details set forth, but desire to avail myself of such changes and alterations as fall within the purview of the following claims.

I claim:

1. A friction pad and shim structure for sound dampening brake squeal noise in a disc brake apparatus in which an actuator element of a piston/caliper structure is engageable with an outer, contact surface of the friction pad and shim structure to press a disc side surface of the friction pad and shim structure against a rotatable disc for exerting a frictional braking force on the disc and wherein the brake squeal noise is of a relatively high frequency and is produced by vibration of the friction pad structure during braking actuation, said friction pad and shim structure comprising, a backing plate, a friction pad, a shim structure, and pin fasteners extending through the shim structure and into the backing plate, said backing plate comprising a steel plate having at least two pin receiving holes in at least two selected backing plate locations for receiving one end portion of a pin fastener in a friction tight, irreversible fit within a pin receiving hole, said shim structure comprising a sheet of aluminum shim material long and wide enough to be configured to cover at least 50% of the area of the outer, contact surface of the backing plate, said sheet of shim material having an inner surface and at least two pin receiving holes on at least two selected shim structure locations, said shim structure also comprising a continuous layer of adhesive on the inner surface only of the sheet of aluminum and adhering the shim structure to the outer, contact surface of said backing plate, said sheet of shim material having a thickness large enough to provide, in combination with the membrane of adhesive, effective sound dampening of the brake squeal noise produced by vibration of the friction pad structure, the locations of the pin receiving holes in the shim material being aligned with the locations of the pin receiving holes in the backing plate, said pin fasteners comprising a retaining pin extending through each opening in the sheet of shim material and into the aligned opening in the backing plate, each retaining pin being deformed within the opening in the backing plate to provide a friction tight, irreversible fit in the related, aligned hole in the backing plate and having the top surface of the retaining pin substantially flush with or within the outer surface of the sheet of shim material, the retaining pin resisting shifting or rotation of the shim structure with respect to the backing plate and the positioning of the top surface of the retaining pin with the outer surface of the sheet of shim material not interfering with the positioning or functioning of an actuator piston structure, caliper structure, or other disc brake structure relative to the surface of the backing plate covered by the shim structure.

2. The invention defined in claim 1 wherein the outer surface of each pin fastener is disposed just slightly below the outer surface of the sheet of shim material.

3. The invention defined in claim 1 wherein the shim material is a sheet of aluminum alloy.

4. The invention defined in claim 1 wherein the adhesive is a high temperature acrylic adhesive.

5. The invention defined in claim 1 wherein the adhesive is a two stage adhesive comprising a layer of thermal setting adhesive and a thinner layer of an acrylic pressure sensitive adhesive.

6. The invention defined in claim 1 wherein the adhesive is a single layer of a thermal setting adhesive.

7. The invention defined in claim 1 wherein each pin fastener has a shank portion and a head portion of larger diameter than the shank portion.

8. The invention defined in claim 7 wherein the pin fastener is a harder material than the shim structure and wherein the head portion of the pin fastener deforms the shim structure material so that the head portion of the pin fastener is counter-sunk within the shim structure.

9. The invention defined in claim 8 wherein the countersinking of the head portion increases the resistance to shear forces tending to separate the shim structure from the backing plate during braking actuation.

10. The invention defined in claim 2 wherein the shank portion has vanes which project outwardly from the shank portion and which are formed, prior to insertion of the pin fastener into the backing plate, to a thread-type configuration.

11. The invention defined in claim 10 wherein the pin fastener is pushed into the opening in the backing plate in the course of manufacture and wherein the vanes are sufficiently deformed during such pushing movement to prevent the thread-type configuration of the vanes from screwing the pin fastener out of the backing plate during the vibrations produced by braking operation of the disc brake apparatus.

12. The invention defined in claim 7 wherein the pin fastener is imbedded within the backing plate and is a different density than the backing plate and also functions as a sound dampening system by interrupting and lowering the sound wave frequency in the backing plate.

* * * * *